Aug. 25, 1964     R. R. RANDALL     3,145,817
CENTRIFUGAL CLUTCH
Filed Sept. 11, 1961                           2 Sheets-Sheet 1
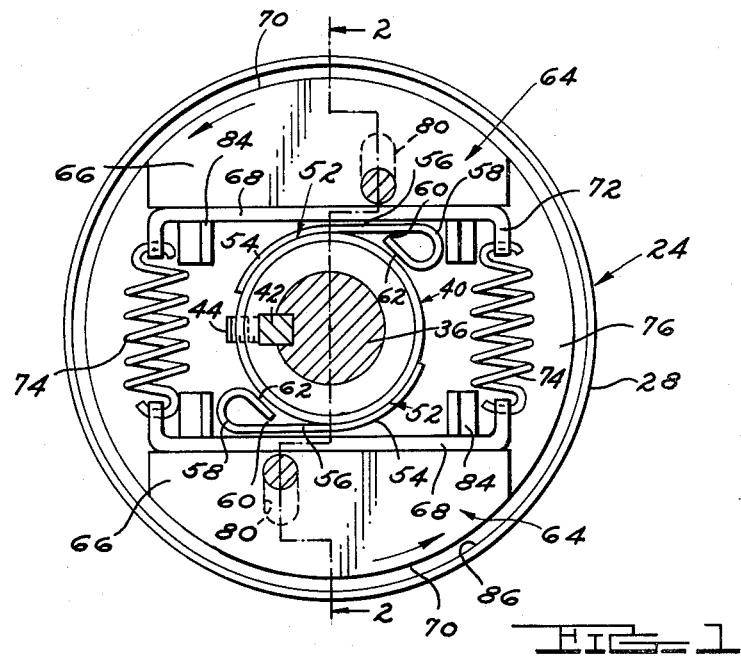
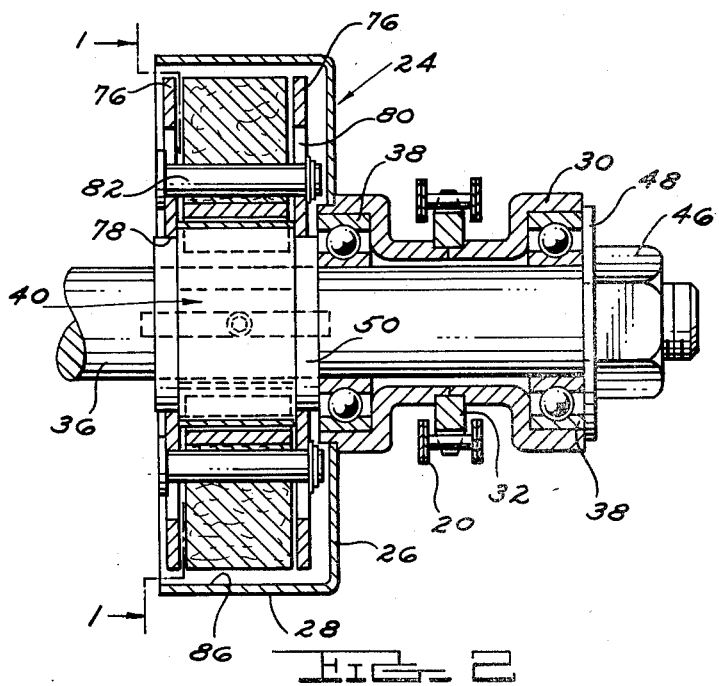
INVENTOR.
RALPH R. RANDALL
BY
Barnes, Kisselle, Raisch & Choate
ATTORNEYS

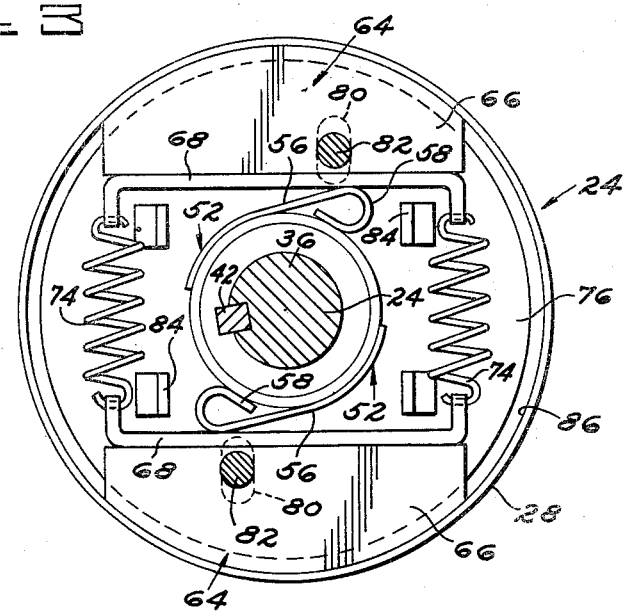
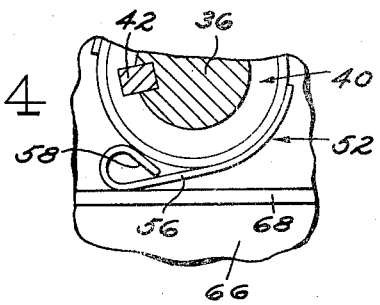

United States Patent Office

3,145,817
Patented Aug. 25, 1964

3,145,817
CENTRIFUGAL CLUTCH
Ralph R. Randall, Freeport, Ill., assignor, by direct and mesne assignments, to Maynard W. Dolphin, Beloit, Wis.
Filed Sept. 11, 1961, Ser. No. 137,344
3 Claims. (Cl. 192—105)

This invention relates to a clutch and more particularly to a centrifugal clutch adapted to form a driving connection between driving and driven rotating members.

It is an object of this invention to provide a centrifugal clutch wherein the driving and driven members are interengaged by means of friction surfaces as distinguished from detents, pawls and the like and wherein the connection between the driving and driven members is adapted to be established in a progressive, as distinguished from an abrupt, manner.

A further object of the invention resides in the provision of a centrifugal clutch of the type having a pair of clutch shoes adapted to be shifted radially into frictional engagement with a clutch drum and which includes means for assuring simultaneous engagement of the two clutch shoes with the clutch drum.

Further objects and advantages of the invention will become apparent from the following description considered in conjunction with the drawings, in which:

FIG. 1 is a sectional view of the clutch of the present invention taken along the line 1—1 in FIG. 2.

FIG. 2 is a sectional view taken along the line 2—2 in FIG. 1.

FIG. 3 is a view similar to FIG. 1 and showing the manner in which the clutch members engage to form a driving connection when the driven member is subjected to a relatively light load.

FIG. 4 is a fragmentary sectional view similar to FIG. 3 showing the manner in which the clutch members are engaged under relatively heavy load.

FIG. 5 is a fragmentary elevational view, partly in section, showing the manner in which the clutch of the present invention may be used in connection with a racing cart.

The clutch of the present invention is adaptable for use in various applications where it is desired to establish a driving connection between the two rotating members. As one example of the numerous applications of the clutch of this invention, in FIG. 5 there is illustrated a racing cart 10 for which the clutch of the present invention is admirably suited for establishing a driving connection between the engine 12 and the traction wheels 14. In the arrangement illustrated in FIG. 5, the cart comprises a frame 16 on which the engine 12 is mounted. The wheels 14 are keyed to an axle 18 journalled on frame 16. The driving connection between engine 12 and wheels 14 includes a chain drive 20 in combination with the clutch 22 of the present invention.

Referring now to FIGS. 1 and 2, clutch 22 comprises a drum 24 having a radial wall 26 and a cylindrical wall 28. A housing 30 is welded or otherwise permanently mounted on the radial wall 26 of drum 24 in coaxial relation thereto. A sprocket 32 is rigidly secured to housing 30 and chain 20 extends around sprocket 32 and a sprocket 34 keyed to axle 18. The drive shaft 36 of engine 12 extends coaxially through drum 24 and housing 30, the housing being journalled thereon by means of bearings 38. Within drum 24, there is arranged on shaft 36 a drive bushing 40. Bushing 40 is connected to shaft 36 by a key 42 locked in place by a set screw 44. The clutch assembly is secured on shaft 36 by means of a nut 46 threaded over the end of shaft 36 and bearing against a washer or retainer 48 which engages the inner race of the outboard bearing 38. The inner race of the inboard bearing 38 is engaged by the flanged hub 50 at one end of bushing 40.

A pair of leaf spring members 52 are permanently secured to the outer periphery of drive bushing 40 in diametrically opposite relation. Each leaf spring member 52 includes a curved portion 54 which wraps around and is secured to the outer periphery of bushing 40 and a tangentially extending leaf spring portion 56 having a spring loop 58 at the end thereof. It will be observed that the spring loop 58 is open at the free end of the spring as at 60 and the spring loop itself is spaced from the outer periphery of drive bushing 40 as at 62.

Within drum 24 and adjacent each of the leaf spring members 52, there is arranged a clutch shoe 64. Each clutch shoe 64 comprises a fiber block 66 having a U-shaped plate 68 secured to the radially inner flat face thereof. The radially outer surface 70 of each block 66 is formed as a segment of a cylinder having a diameter generally corresponding to the inner diameter of the cylindrical wall 28 of clutch drum 24. The inwardly turned ends 72 of the two plates 68 are interconnected by coiled tension springs 74 which bias the two clutch shoes 64 radially inwardly toward one another.

At the opposite axial faces of the clutch shoes, there is arranged a pair of circular plates 76 which are centrally apertured as at 78 for a close fit with drive bushing 40. Each plate 76 is fashioned with a pair of slots 80 which extend in generally radial directions but are radially offset with respect to one another. The two plates 76 are interconnected with the two clutch shoes 64 by means of pins 82 extending through the two shoes and the slots 80 in each plate. Pins 82 are off center with respect to the shoes. The heads at the opposite ends of pins 82 overlap the side edges of the slots 80 so as to retain the plates 76 and shoes 64 in assembled relation. Each plate 76 is provided with inwardly struck lugs 84 which form stops limiting the radial inward movement of clutch shoes 64. When the clutch shoes 64 are engaged with stops 84, the outer cylindrical surface 70 of each block 66 is spaced radially inwardly from and out of engagement with the inner cylindrical surface 86 of clutch drum 24.

The operation of the clutch described is as follows: When the engine shaft 36 rotates, the leaf spring member 52 rotates in a counterclockwise direction as viewed in FIG. 1. The flat extensions 56 of leaf spring members 52 engage the radially inner faces of plates 68 to form a rotating driving connection between shaft 36 and the two clutch shoes 64. Springs 74 are designed such that the tension thereof is sufficient to overcome the centrifugal force of the rotating clutch shoes 64 until the speed of rotation reaches a predetermined value.

Let us assume, for example, that springs 74 are designed to overcome the centrifugal force of shoes 64 until the shoes are rotated at a speed of 3000 r.p.m. As soon as the speed of shoes 64 exceeds a speed of 3000 r.p.m., the centrifugal force of shoes 64 overcomes the tension of spring 74 and the two shoes shift radially outwardly in response to the centrifugal force and the action of the leaf spring members 52 which tend to overrun the shoes. Eventually, as the speed of rotation increases, the outer cylindrical surfaces 70 of the two shoes come into frictional contact with the inner peripheral surface 86 of clutch drum 24.

In this connection, it will be observed that the circular plates 76 perform a very important function. These plates serve as a synchronizing means to assure that each shoe moves radially outwardly simultaneously and at equal rates so that both shoes contact the inner periphery of drum 24 at the same instant. The interengagement of pins 82 and slots 80 prevents the two clutch shoes from shifting circumferentially with respect to one another; and since leaf spring members 52 are of identical shape and dimensions and symmetrically arranged on drive bushing 40, when one shoe moves outwardly a predetermined distance, a thirty-secondth of an inch, for example, the other shoe moves outwardly a corresponding amount. The slots 80 and pins 82 are preferably located in radially offset relation; that is, they are off center with respect to the shoes so that when the leaf spring members 52 urge the two shoes radially outwardly to a position where the shoes engage the inner peripheral surface 86 of the clutch drum, the pins 80 are generally aligned with the loops 58 at the ends of the springs. It has been found that when the slots 80 and pins 82 are so located, a smoother clutching action is obtained.

However, the mere frictional engagement of each shoe 64 with the inner periphery of drum 24 is not sufficient to establish a driving connection between drive shaft 36 and drum 24. The clutch shoes 64 will merely slip around the inner peripheral surface of drum 24 until they are urged in a radially outward direction with sufficient force to overcome the load tending to resist rotation of the clutch drum. Thus, the point at which the clutch shoes 64 will lock with the clutch drum 24 will depend upon the radial force exerted by the leaf spring members 52 on the clutch shoes. If the load on the clutch drum is relatively light, then the two shoes 64 would lock with the drum 24 to establish a driving connection between driving shaft 36 and drum 24 at a point where the two leaf spring members 52 flexed only slightly, for example, to a position wherein the spring loops 58 bear against the outer periphery of drive bushing 40 as shown in FIG. 3. On the other hand, if the drum is subjected to a heavy load, then a driving connection between drive shaft 36 and drum 24 might not be established until the spring loops 58 actually closed as shown in FIG. 4. It will be appreciated that it requires less force to merely flex the flat spring extensions 56 to the position shown in FIG. 3 than to compress the loops to closed position as shown in FIG. 4.

The use of driving members 52 in the form of spring cams thus serves a very important function. In the first place, it results in a slipping action between the clutch shoes and the clutch drum which makes for a smooth, as distinguished from an abrupt, engagement of the clutch. Furthermore, the two-stage spring action is very desirable in many applications where the load might vary considerably. In the case of a racing cart such as shown in FIG. 5, for example, if a small child were on the cart, the driving connection might be established when the springs 52 flex to the position illustrated in FIG. 3. If the springs were not capable of flexing further to the configuration shown in FIG. 4, for example, if a heavy adult were on the cart, the clutch might lock too soon and stall the engine. By providing a multiple-stage spring, the spring rate in the two stages being different, the engine speed can be raised to the value required to drive the load before the clutch shoes 64 positively lock with the clutch drum.

I claim:

1. A centrifugal clutch comprising a cylindrical clutch drum adapted to be connected to a driven member, a drive shaft extending coaxially into said drum, a pair of diametrically opposite clutch shoes on opposite sides of the shaft in said drum, spring means interconnecting the two shoes and urging them radially inwardly toward each other, said shoes being adapted to shift radially outwardly in response to centrifugal action so that the outer periphery of each shoe frictionally engages the inner periphery of the drum along diametrically opposite portions thereof, said drive shaft having a pair of leaf springs mounted thereon at diametrically opposite portions thereof, said leaf springs each having one end secured to the shaft and extending in a direction generally tangentially of the shaft, said leaf springs forming a pair of diametrically opposite resilient cam projections on the shaft adapted to engage the radially inner surfaces of said shoes and providing the sole driving connection between the shaft and the clutch shoes, the free end portion of each spring being return bent into a loop which is spaced radially from the shaft, the free end of the spring at said loop being spaced from the portion of the spring which it overlies so that each loop is normally open, said loop being more rigid than the tangentially extending portion of the spring with respect to the force required to compress the loop into closed position and the force required to flex the tangentially extending portion of the spring to a position wherein the loop contacts the shaft, said spring means biasing the radially inner surfaces of said clutch shoes into engagement with said springs and means interconnecting the two clutch shoes to prevent relative circumferential displacement thereof and to restrict the clutch shoes to radial movement in unison whereby when the shaft is rotated in a direction counter to that in which the springs project from the shaft and the shoes shift radially outwardly into engagement with the inner periphery of the drum in response to centrifugal force, said springs are responsive to the extent of the load on the drum tending to resist rotation to first flex to a position wherein the loops are displaced radially inwardly into contact with the shaft and thereafter, the spring loops are compressed between the clutch shoes and the shaft to the closed position.

2. A centrifugal clutch as called for in claim 1 wherein said last mentioned means comprise a pair of discs at the axially opposite faces of the clutch shoes, said discs each having a pair of diametrically opposite, radially extending slots therein, said slots being parallel and radially offset relative to one another, each of said shoes having a pin projecting axially from opposite sides thereof and having a relatively close fit in said slots, said pins being located closer to the trailing edges of the clutch shoes than from the leading edges of the clutch shoes.

3. A centrifugal clutch as called for in claim 2 wherein said springs, when flexed, engage the radially inner surfaces of said shoes at locations closely adjacent said pins.

References Cited in the file of this patent

UNITED STATES PATENTS

| | | |
|---|---|---|
| 1,926,483 | Hatcher | Sept. 12, 1933 |
| 2,034,988 | Nilsson et al. | Mar. 24, 1936 |
| 2,452,111 | Eaton | Oct. 26, 1948 |
| 2,781,882 | Burkhardt | Feb. 19, 1957 |

FOREIGN PATENTS

| | | |
|---|---|---|
| 1,121,178 | France | Apr. 30, 1956 |
| 1,164,676 | France | May 19, 1958 |
| 773,636 | Great Britain | May 1, 1957 |